(12) United States Patent
Kimura et al.

(10) Patent No.: US 8,605,557 B2
(45) Date of Patent: Dec. 10, 2013

(54) OPTICAL PICKUP

(71) Applicant: Hitachi Media Electronics Co., Ltd., Oshu (JP)

(72) Inventors: Katsuhiko Kimura, Kasumigaura (JP); Hidenao Saito, Yokohama (JP); Jun Hato, Fujisawa (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 0 days.

(21) Appl. No.: 13/733,937

(22) Filed: Jan. 4, 2013

(65) Prior Publication Data

US 2013/0188467 A1 Jul. 25, 2013

(30) Foreign Application Priority Data

Jan. 20, 2012 (JP) ................................. 2012-009597

(51) Int. Cl.
   *G11B 7/00* (2006.01)
(52) U.S. Cl.
   USPC ...................................................... 369/44.14
(58) Field of Classification Search
   USPC ......... 369/44.14–44.16, 44.22; 359/811, 813, 359/822, 823
   See application file for complete search history.

(56) References Cited

U.S. PATENT DOCUMENTS

| 2004/0240335 | A1* | 12/2004 | Cho et al. | 369/44.15 |
| 2004/0268373 | A1* | 12/2004 | Song et al. | 369/44.22 |
| 2006/0077782 | A1* | 4/2006 | Yamada | 369/44.15 |
| 2006/0239137 | A1* | 10/2006 | Kim et al. | 369/44.14 |
| 2006/0280060 | A1* | 12/2006 | Imai et al. | 369/44.14 |
| 2007/0171776 | A1* | 7/2007 | Uragami et al. | 369/44.15 |
| 2009/0238062 | A1* | 9/2009 | Onojima et al. | 369/112.23 |
| 2011/0247021 | A1* | 10/2011 | Yamada et al. | 720/681 |

FOREIGN PATENT DOCUMENTS

JP 2006-309889 11/2006

* cited by examiner

*Primary Examiner* — Thang Tran
(74) *Attorney, Agent, or Firm* — Antonelli, Terry, Stout & Kraus, LLP.

(57) ABSTRACT

An optical pickup which excels in assembly workability and which can increase the drive force generated in a focusing coil is provided. The optical pickup has an objective lens, a lens holder holding the objective lens, and a first and a second focusing coil wound around the lens holder. The first focusing coil includes an upper part wound about a central axis extending in parallel with an optical axis of the objective lens and a lower part connected to the upper part. The second focusing coil includes an upper part wound, in a wiring system separate from the first focusing coil, about a central axis extending in parallel with the optical axis of the objective lens and a lower part connected to the upper part.

17 Claims, 6 Drawing Sheets

OPTICAL PICKUP

CLAIM OF PRIORITY

The present application claims priority from Japanese Patent application serial No. 2012-009597, filed on Jan. 20, 2012, the content of which is hereby incorporated by reference into this application.

FIELD OF THE INVENTION

The present invention relates to an optical pickup installed in an optical disc drive for reading information recorded on a recording surface of an optical disc or recording information on an optical disc.

BACKGROUND OF THE INVENTION

Relevant background art is described in Japanese Unexamined Patent Publication No. 2006-309889.

In the configuration described in Japanese Unexamined Patent Publication No. 2006-309889, a focusing coil is wound fully around the peripheral side of a lens holder holding an objective lens, and tilt coils are provided inside lens holder holes formed, to extend in a focusing direction, in the lens holder (see paragraphs 0042 and 0043 and FIGS. 4 and 5).

SUMMARY OF THE INVENTION

In the configuration described in Japanese Unexamined Patent Publication No. 2006-309889, the tilt coils are provided inside the lens holder holes formed in the lens holder, so that the tilt coils cannot be wound directly around the lens holder. This makes it necessary to attach the tilt coils prepared in a different process to the lens holder.

Also, according to Japanese Unexamined Patent Publication No. 2006-309889, supporting members to support the lens holder are fixed at the same height, in the optical axis direction of the objective lens, as the focusing coil. Therefore, to wind the focusing coil directly around the lens holder, separate fixing members for fixing the supporting members are required.

Also, according to Japanese Unexamined Patent Publication No. 2006-309889, both the focusing coil and the tilt coils are used, so that it is difficult to increase the number of turns of the focusing coil within a limited space in the lens holder. Tracing an optical disc turning at a high speed particularly requires an adequate focusing coil drive force. According to Japanese Unexamined Patent Publication No. 2006-309889, however, adequate consideration is not paid as to increasing the drive force generated by the focusing coil.

An object of the present invention is to provide an optical pickup which excels in assembly workability and which can increase the drive force generated by a focusing coil.

To achieve the above object, the present invention provides an optical pickup having an objective lens which focuses light on an optical disc, a lens holder holding the objective lens, a first and a second focusing coil wound around the lens holder, and a supporting member supporting the lens holder. In the optical pickup: the first focusing coil includes an upper part wound about a central axis extending in parallel with an optical axis of the objective lens and a lower part connected to the upper part via a connection line; and the second focusing coil includes an upper part wound, in a wiring system separate from the first focusing coil, about a central axis extending in parallel with the optical axis of the objective lens and a lower part connected to the upper part via a connection line.

Also, to achieve the above object, preferably, in the optical pickup according to the present invention, the lower part of the first focusing coil and the lower part of the second focusing coil serve to effect both focusing operation and tilting operation.

Also, to achieve the above object, preferably, in the optical pickup according to the present invention, each of the lower part of the first focusing coil and the lower part of the second focusing coil is wound around a part of the lens holder, the part of the lens holder projecting downward along an optical axis direction of the objective lens.

Also, to achieve the above object, preferably, in the optical pickup according to the present invention, the upper part of the first focusing coil and the upper part of the second focusing coil are overlappingly wound around the lens holder.

Also, to achieve the above object, preferably, in the optical pickup according to the present invention, the lens holder includes two parts projecting downward along the optical axis direction with a space formed between the two projecting parts.

Also, to achieve the above object, the present invention provides an optical pickup installed in an optical disc drive and used, at least, to read information from an optical disc. The optical pickup includes an objective lens which focuses light on an optical disc, a lens holder holding the objective lens, and a focusing coil wound around the lens holder. In the optical pickup: the lens holder includes a first coil winding part and a second coil winding part which are dividedly formed on two sides perpendicularly across an optical axis direction of the objective lens so as to form a space between the first coil winding part and the second coil winding part below the objective lens; and the focusing coil at least includes a first coil part wound around the first coil winding part and a second coil part wound around the second coil winding part.

Also, to achieve the above object, the present invention provides an optical pickup installed in an optical disc drive and used, at least, to read information from an optical disc. The optical pickup includes an objective lens which focuses light on an optical disc, a lens holder holding the objective lens, a focusing coil wound around the lens holder, and a plurality of supporting members for supporting the lens holder. In the optical pickup, the lens holder includes: a coil winding part divided, in an optical axis direction of the objective lens, into two layers, a plurality of brim parts provided between the two layers and on two sides, in the optical axis direction, of the two layers, the brim parts projecting from a coil winding surface of the coil winding part in a direction crossing the optical axis direction; and a plurality of supporting member fixing parts which are provided in the brim parts and which fix the supporting members at their ends on one side. In the optical pickup, the focusing coil is dividedly wound in the two layers.

According to the present invention, an optical pickup which excels in assembly workability and which can increase the drive force generated by a focusing coil can be provided.

BRIEF DESCRIPTION OF THE DRAWINGS

FIG. 6A showing the lens holder separately from a focusing coil to be wound therearound and FIG. 6B showing the lens holder wound with the focusing coil; FIG. 7A showing the lens holder separately from focusing coils to be wound therearound and FIG. 7B showing the lens holder wound with the focusing coils.

DETAILED DESCRIPTION OF THE PREFERRED EMBODIMENTS

In the following, embodiments of the present invention will be described with reference to drawings.

First Embodiment

Figure 1:
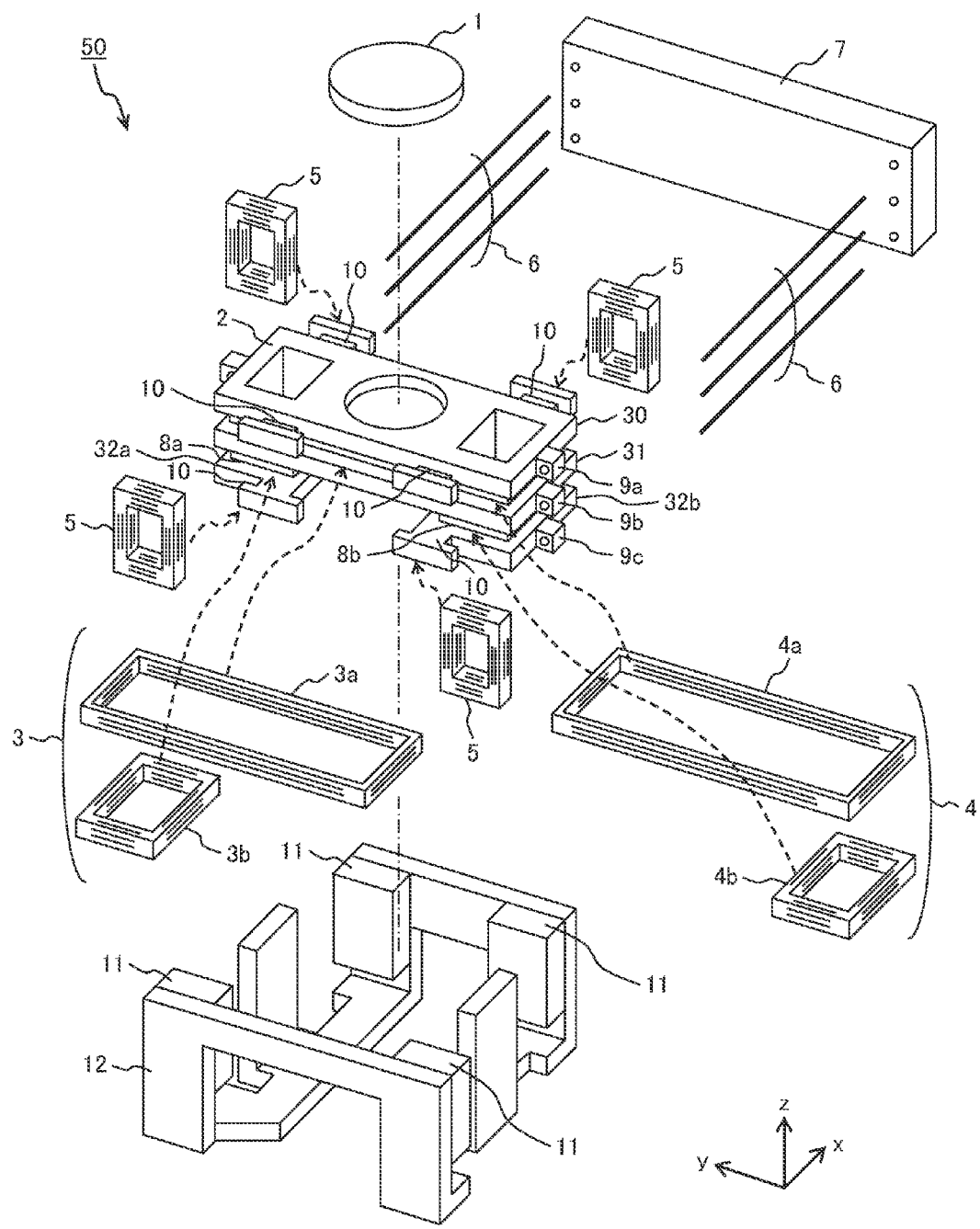
FIG. 1 is an exploded perspective view of an optical pickup according to a first embodiment of the present invention.

FIG. 1 is an exploded perspective view showing an objective lens driving apparatus 50 included in an optical pickup according to a first embodiment of the present invention.

In FIG. 1, direction z represents the optical axis direction of an objective lens 1. The optical axis direction is a focusing direction along which the objective lens 1 is moved toward or away from an optical disc, not shown, for focusing.

An upper side along the direction z is closer to the optical disc and a lower side along the direction z is farther from the optical disc. Direction y represents a radial direction of the optical disc. The radial direction is a tracking direction along which the objective lens 1 is moved for positioning relative to the tracks of the optical disc. Direction x represents a tangential direction of the optical disc and is perpendicular to both the direction y and direction z. The direction of turning of the optical disc about the direction x represents a tilt direction in which the radial direction of the optical disc is tilted.

Referring to FIG. 1, the objective lens 1 is mounted on the top side of a lens holder 2. The lens holder 2 has, in a lower portion thereof, projections 8a and 8b positioned oppositely to each other to be on two sides along the tracking direction, i.e. the radial direction of the optical disc. The lens holder 2 also has, on each side along the tracking direction, a first supporting member fixing part 9a, a second supporting member fixing part 9b, and a third supporting member fixing part 9c positioned in the mentioned order along the optical axis direction of the objective lens 1 with the first supporting member fixing part 9a being closest to the objective lens 1.

The focusing coils include a first focusing coil 3 and a second focusing coil 4. The first focusing coil 3 has an upper part 3a to be wound fully around the peripheral side of the lens holder 2 and a lower part 3b to be wound around the projection 8a provided in a lower portion on one side of the lens holder 2. The second focusing coil 4 has an upper part 4a to be wound fully around the peripheral side of the lens holder 2 and a lower part 4b to be wound around the projection 8b provided in a lower portion on the other side of the lens holder 2.

Tracking coils 5 are wound around winding frames 10 provided on the lens holder 2. The winding frames 10 are provided such that the upper ones of them are above the upper part 3a of the first focusing coil 3 and the upper part 4a of the second focusing coil 4, respectively, and such that the lower ones of them are below the lower part 3b of the first focusing coil 3 and the lower part 4b of the second focusing coil 4, respectively.

The lens holder 2 is supported by supporting members 6 to be displaceable relative to a fixing part 7. The supporting members 6 on each side of the lens holder 2 are fixed, each at one end thereof, by the first to third supporting member fixing parts 9a, 9b, and 9c, respectively. The other end of each of the supporting members 6 is fixed by the fixing part 7. The first focusing coil 3, the second focusing coil 4, and the tracking coils 5 are electrically connected, for example, by soldering, to the ends on one side of the supporting members 6.

Magnets 11 are attached to a magnetic yoke 12 made of magnetic material. Each two of the magnets 11 are provided opposing to each of two sides of the lens holder 2. The two side of the lens holder 2 extend in parallel with both the focusing direction and the tracking direction.

FIGS. 2A to 2D illustrate a process in which the first focusing coil 3, the second focusing coil 4, and the tracking coils 5 are wound on the lens holder 2.

Figure 2A:
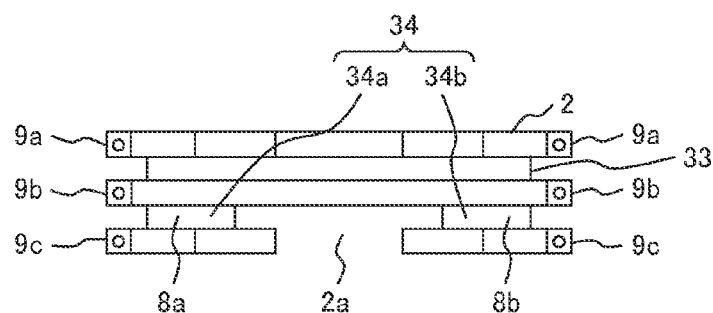
FIGS. 2A to 2D illustrate a process in which coils are wound around a lens holder according to the first embodiment of the present invention.

FIG. 2A shows the lens holder 2 with no coil wound thereon.

Figure 2B:
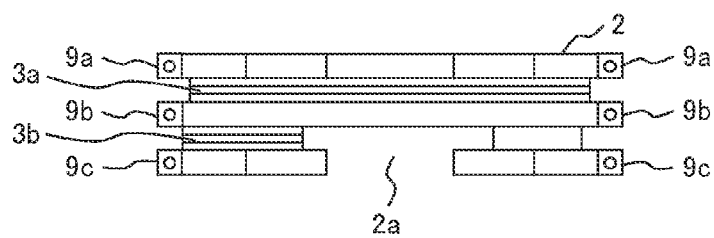

FIG. 2B shows the lens holder 2 with the upper part 3a of the first focusing coil 3 wound fully around the peripheral side thereof and the lower part 3b of the first focusing coil 3 wound around the projection 8a provided in a lower portion on one side thereof.

Figure 2C:
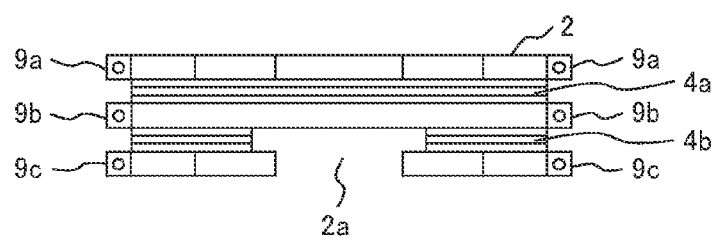

FIG. 2C shows the lens holder 2 with the upper part 4a of the second focusing coil 4 wound over the upper part 3a of the first focusing coil 3 and the lower part 4b of the second focusing coil 4 wound around the projection 8b provided in a lower portion on the other side thereof. Namely, the lens holder 2 is thickly wound with the upper part 3a of the first focusing coil 3 and the upper part 4a of the second focusing coil 4 that is wound over the upper part 3a of the first focusing coil 3.

The upper part 3a of the first focusing coil 3 and the upper part 4a of the second focusing coil 4 are wound to be between, in the optical axis direction of the objective lens 1, the first supporting member fixing parts 9a and the second supporting member fixing parts 9b. The lower part 3b of the first focusing coil 3 and the lower part 4b of the second focusing coil 4 are wound to be between, in the optical axis direction of the objective lens 1, the second supporting member fixing parts 9b and the third supporting member fixing parts 9c.

Figure 2D:
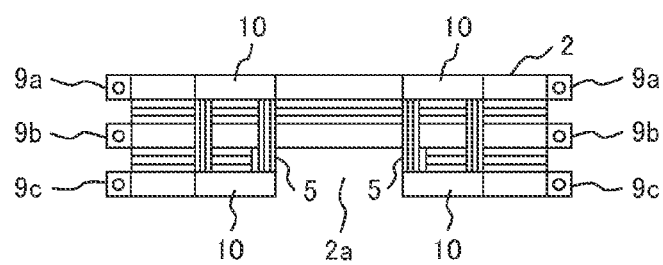

FIG. 2D shows the lens holder 2 with the tracking coils 5 also wound thereon.

As shown in FIGS. 2A to 2D, a space 2a is formed between the left and right projections 8a and 8b. The space 2a is provided to facilitate winding the lower part 3b of the first focusing coil 3 and the lower part 4b of the second focusing coil 4 around the projections 8a and 8b, respectively, of the lens holder 2 using a mechanical means. Namely, the space 2a is required to allow a coil supply nozzle (not shown) for supplying a focusing coil to rotate around each of the projections 8a and 8b. The upper part 3a of the first focusing coil 3 and the upper part 4a of the second focusing coil 4 to be directly wound around the side wall of the lens holder 2 do not require the space 2a.

Differences between the focusing (tilt) coil attached to an existing type of lens holder and the focusing (tilt) coil of the present embodiment will be described below with reference to FIG. 3.

Figure 3:
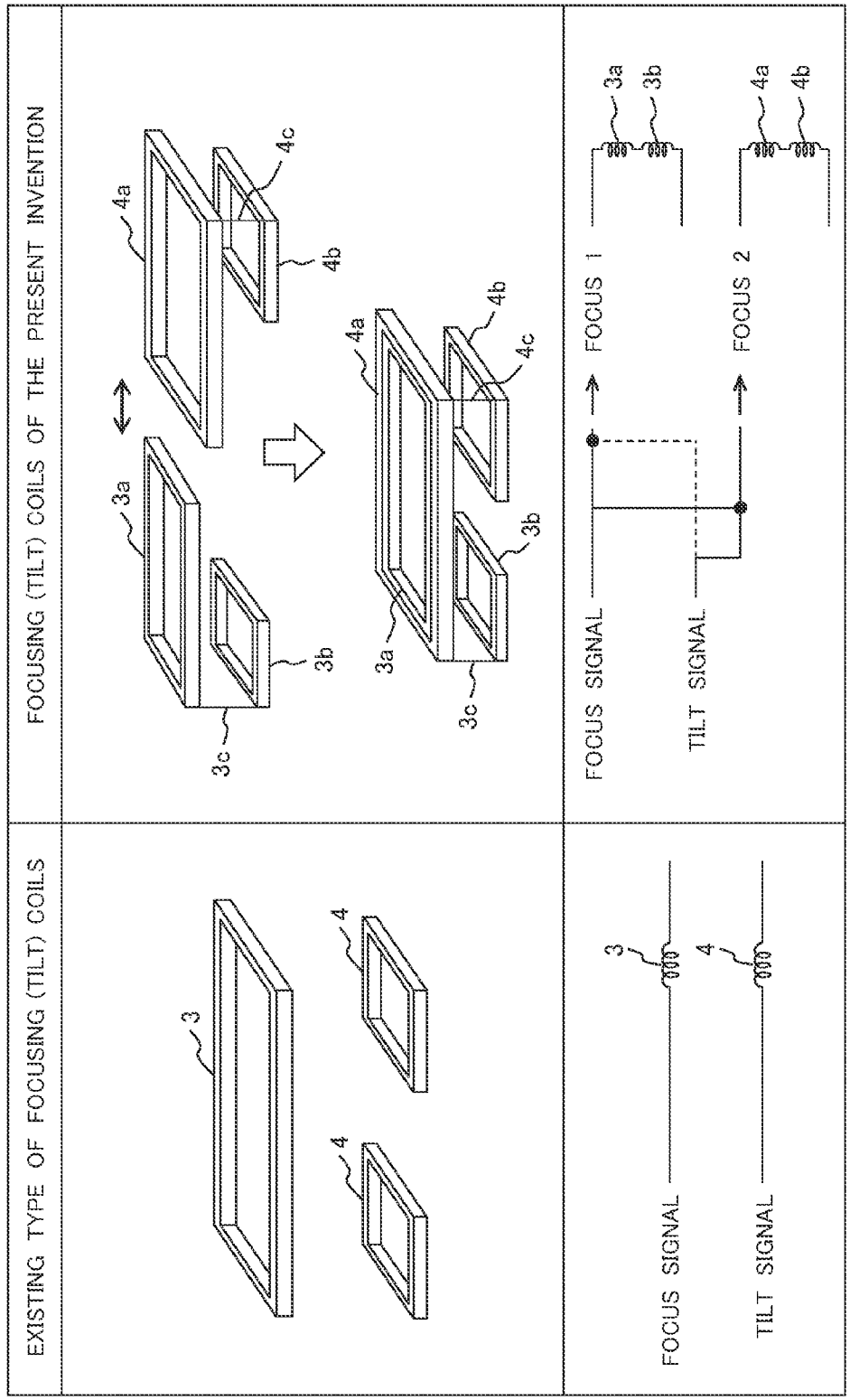
FIG. 3 shows a table in which an existing type of focusing (tilt) coil and a focusing (tilt) coil according to the present embodiment are compared.

In FIG. 3, an existing type of focusing (tilt) coil and the focusing (tilt) coil of the present embodiment are compared.

Referring to FIG. 3, to make up an existing type of focusing (tilt) coil, a focusing coil and tilt coils are separately formed to be then manually attached to a lens holder. The focusing coil and the tilt coils are wired independently of each other to be controlled also independently of each other.

In the present embodiment, on the other hand, the focusing coil 3a and the focusing coil 3b are connected via a connection line 3c, and the focusing coil 4a and the focusing coil 4b are connected via a connection line 4c. These coils are, as indicated by a two-headed arrow in FIG. 3, put together to make up an assembly as pointed to by a blank arrow in FIG. 3.

The first focusing coil 3 (the upper and lower parts 3a and 3b) and the second focusing coil 4 (the upper and lower parts 4a and 4b) have a same focus signal inputted to them. This allows electromagnetic actions occurring between the first and second focusing coils 3 and 4 and the magnets 11 to generate drive forces in the focusing direction. A tilt signal is inputted to either the first focusing coil 3 or the second focusing coil 4 by being added to the focus signal inputted to the first focusing coil 3 or the second focusing coil 4. This causes a difference between the drive forces generated by the first and second focus coils 3 and 4, respectively. At this time, the difference between the drive forces generated by the lower part 3b of the first focusing coil 3 and the lower part 4b of the second focusing coil 4 generates a drive force to tilt the lens holder 2 in the tilt direction.

As described above, according to the present embodiment, the lower parts 3b and 4b of the first and second focusing coils 3 and 4 also contribute to the focusing operation of the first and second focusing coils 3 and 4. This makes a larger drive force available for focusing operation and results in power saving.

Figure 4:
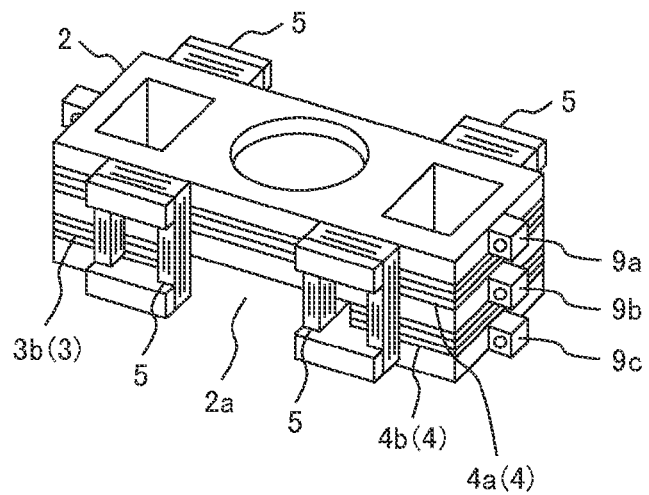
FIG. 4 is a perspective view of the lens holder according to the first embodiment of the present invention.

FIG. 4 is a perspective view of the lens holder 2 wounded with the first focusing coil 3, the second focusing coil 4, and the tracking coils 5.

Figure 5:
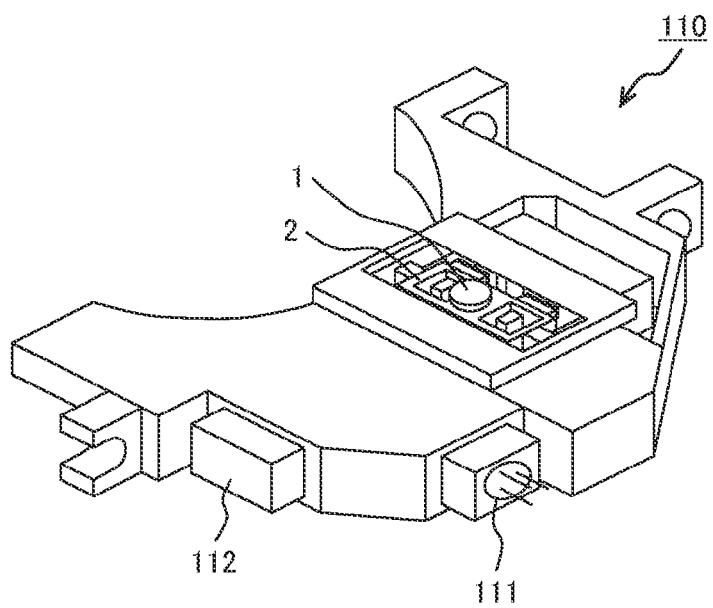
FIG. 5 is a perspective view of the optical pickup according to the present invention.

FIG. 5 is a perspective view of an optical pickup 110.

Referring to FIG. 5, a laser beam emitted from a laser emitting device 111 included in the optical pickup 110 is focused on an optical disc, not shown, via the objective lens 1 and is reflected from the optical disc. The laser beam reflected from the optical disc passes through the objective lens 1 and enters a photo detector 112 included in the optical pickup 110. A servo signal is detected from the signal obtained by the photo detector 112 and, based on the servo signal, a drive current is inputted to the first focusing coil 3, the second focusing coil 4, and the tracking coils 5 included in an objective lens drive apparatus 50 shown in FIG. 1. Positioning of the objective lens 1 is controlled in this way. A reproduction signal is also detected from the signal obtained by the photo detector 112 and is used to reproduce information recorded on the optical disc.

Thus, according to the present embodiment, the lens holder 2 can be configured with a single member. Since the single lens holder 2 can be directly wound with all coils required, the number of parts of the optical pickup 110 can be reduced and assembly workability can be improved.

To be concrete, the upper part 3a of the first focusing coil 3 and the upper part 4a of the second focusing coil 4 are wound to be between the first supporting member fixing parts 9a and the second supporting member fixing parts 9b; and the lower part 3b of the first focusing coil 3 and the lower part 4b of the second focusing coil 4 are wound to be between the second supporting member fixing parts 9b and the third supporting member fixing parts 9c. This makes it possible to form all the supporting member fixing parts 9a, 9b, and 9c integrally with the lens holder 2, so that it is not necessary to prepare supporting member fixing parts as separate members.

The winding frames 10 of the lens holder 2 to be wound with the tracking coils 5 include the upper ones to be above the upper part 3a of the first focusing coil 3 and the upper part 4a of the second focusing coil 4 and the lower ones to be below the lower part 3b of the first focusing coil 3 and the lower part 4b of the second focusing coil 4. This allows the first focusing coil 3 and the second focusing coil 4 to be wound directly around the lens holder 2 without being interfered with by the winding frames 10.

The tracking coils 5 can be wound directly around the winding frames 10 of the lens holder 2.

The projections 8a and 8b provided on two sides of the lens holder 2, respectively, allow the lower part 3b of the first focusing coil 3 and the lower part 4b of the second focusing coil 4 that contribute to generation of a tilt drive force to be wound directly around the lens holder 2.

As described above, according to the present embodiment, the lens holder 2 configured with a single member can be directly wound with all coils required. According to an existing technique, a focusing coil and tilt coils are wound into rectangular shape beforehand to be then manually attached to a lens holder. In such a way, attaching a focusing coil and tilt coils to a lens holder takes time and increases labor cost. According to the present embodiment, the focusing coils and tilt coils can be wound directly around the lens holder, so that production cost can be greatly reduced.

Another effect of the present embodiment is that the drive force generated by the focusing coils can be increased as described below.

In an existing case in which a focusing coil is directly wound fully around the peripheral side of a lens holder, it can be wound to be only between two supporting member fixing parts. In the present embodiment, on the other hand, in addition to the upper part 3a of the first focusing coil 3 and the upper part 4a of the second focusing coil 4 wound fully around the peripheral side of the lens holder 2, the lower part 3b of the first focusing coil 3 and the lower part 4b of the second focusing coil 4 can be wound around the projections 8a and 8b, respectively, of the lens holder 2. In this way, in the configuration in which the focusing coils are wound directly around the lens holder 2, the number of turns of the focusing coils can be increased. Namely, the drive force generated by the focusing coils can be increased.

Furthermore, according to the present embodiment, the optical pickup can be made thinner. To be concrete, there is the space 2a between the projections 8a and 8b formed on two sides of the lens holder 2. The space 2a allows a laser beam to pass through the space 2a, and a reflection mirror for reflecting the laser beam to the objective lens 1 can be disposed in the space 2. This makes it possible to provide a thin optical pickup.

Second Embodiment

A second embodiment of the present invention will be described below with reference to FIGS. 6A and 6B.

Figure 6A:
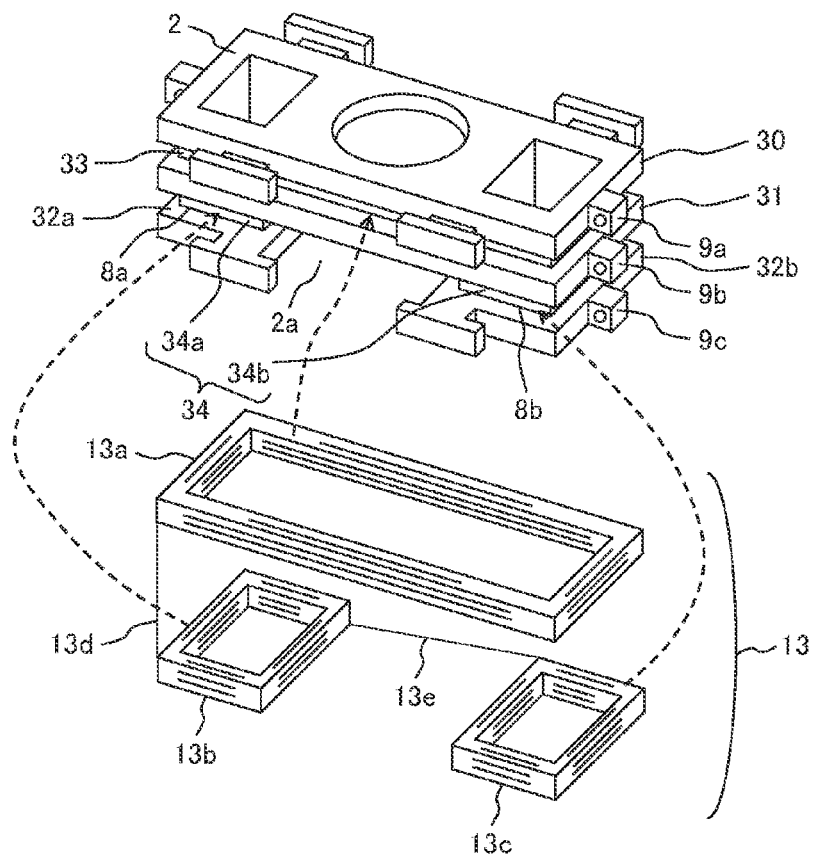
FIGS. 6A and 6B are perspective views of a lens holder according to a second embodiment of the present invention.

FIG. 6A is a perspective view of a lens holder 2 and a focusing coil 13 to be wound around the lens holder 2.

Referring to FIG. 6A, the focusing coil 13 includes an upper part 13a to be wound fully around the peripheral side of the lens holder 2, a lower part 13b to be wound around a projection 8a formed on one side of the lens holder 2, and a lower part 13c to be wound around a projection 8b formed on the other side of the lens holder 2.

The upper part 13a of the focusing coil 13 is wound to be between first supporting member fixing parts 9a and second supporting member fixing parts 9b of the lens holder 2. The lower parts 13b and 13c of the focusing coil 13 are wound to be between the second supporting member fixing parts 9b and third supporting member fixing parts 9c.

Figure 6B:
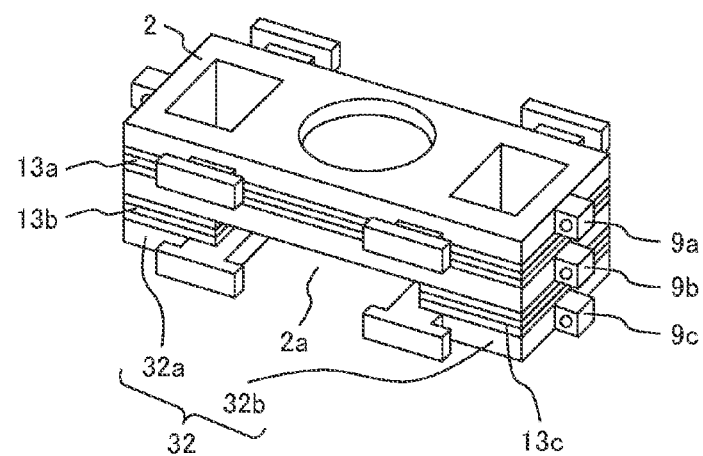

FIG. 6B is a perspective view of the lens holder 2 wound with the focusing coil 13. In the other respects, the lens holder 2 is configured to be the same as the lens holder 2 of the first embodiment.

According to the present embodiment, the upper part 13a and lower parts 13b and 13c of the focusing coil 13 are connected as a system, so that it does not generate a tilt drive force. Hence, the focusing coil 13 of the present embodiment is applied, for example, to a device specialized in playback requiring no tilt operation.

According to the present embodiment configured as described above, as in the first embodiment, the lens holder 2 configured with a single member can be directly wound with all coils required. This makes it possible to increase the drive force generated by the focusing coil and to make the optical pickup thinner.

Furthermore, in the present embodiment, fewer focusing coils are used than in the first embodiment, so that production cost can be reduced.

As also described in connection with the first embodiment, in the present embodiment, too, there is a space 2a formed between the projections 8a and 8b, so that a coil supply nozzle (not shown) for supplying the lower parts 13b and 13c of the focusing coil 13 can be rotationally moved through the space 2a.

Third Embodiment

Figure 7A:
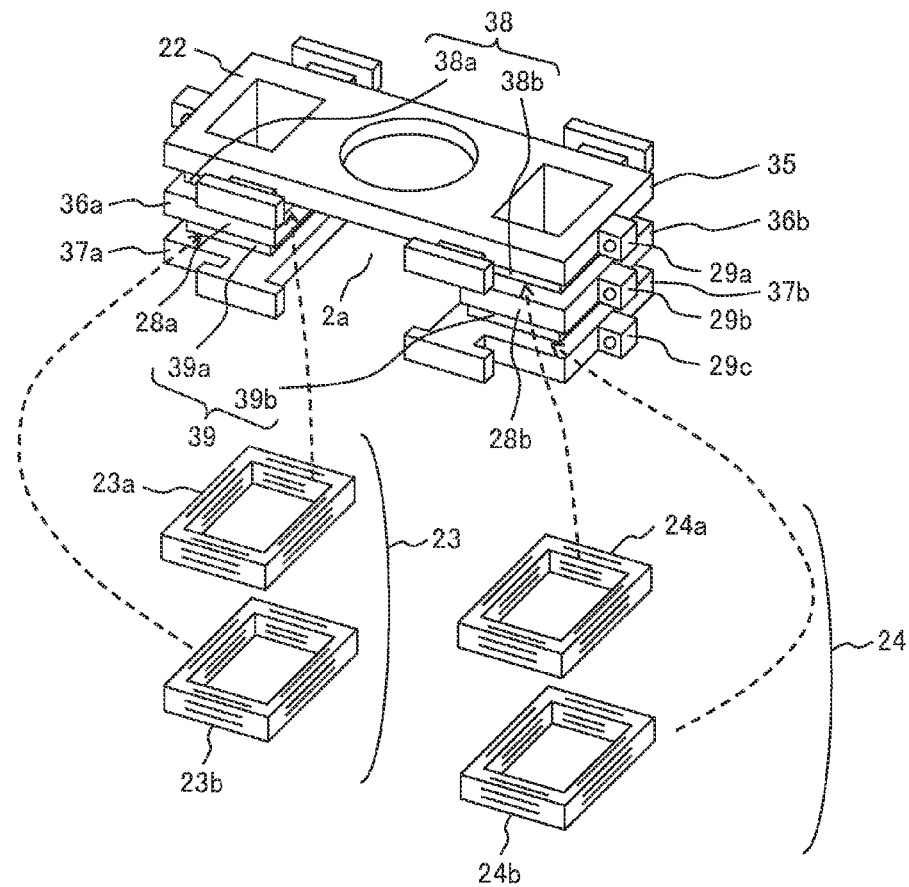
FIGS. 7A and 7B are perspective views of a lens holder according to a third embodiment of the present invention.
Figure 7B:
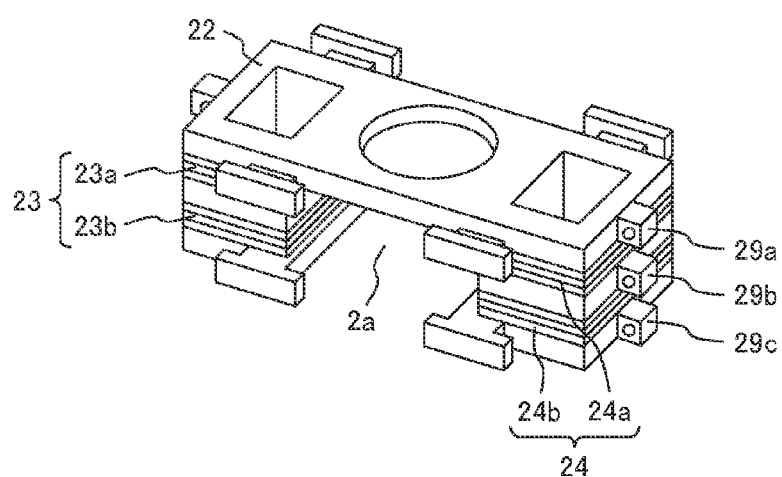

A third embodiment of the present embodiment is shown in FIGS. 7A and 7B.

FIG. 7A is a perspective view of a lens holder 22 and the focusing coils to be wound around the lens holder 22.

Referring to FIG. 7A, the lens holder 22 includes projections 28a and 28b formed in a lower portion thereof to be on one side and on another side, respectively, along the tracking direction, i.e. the radial direction of the optical disc. The lens holder also includes, on each of two lateral sides thereof, a first supporting member fixing part 29a, a second supporting member fixing part 29b, and a third supporting member fixing part 29c arranged in the mentioned order along the optical axis direction of an objective lens 1 with the first supporting member fixing part 29a being closest to the objective lens 1.

The focusing coils include a first focusing coil 23 and a second focusing coil 24. The first focusing coil 23 includes an upper part 23a and a lower part 23b both to be wound around the projection 28a on one side of the lens holder 22 with the upper part 23a to be closer to the objective lens 1 than the lower part 23b.

The second focusing coil 24 includes an upper part 24a and a lower part 24b both to be wound around the projection 28b on the other side of the lens holder 22 with the upper part 24a to be closer to the objective lens 1 than the lower part 24b.

Each of the upper part 23a of the first focusing coil 23 and the upper part 24a of the second focusing coil 24 is wound to be between the first supporting member fixing part 29a and the second supporting member fixing part 29b on the corresponding side of the lens holder 22. Each of the lower part 23b of the first focusing coil 23 and the lower part 24b of the second focusing coil 24 is wound to be between the second supporting member fixing part 29b and the third supporting member fixing part 29c on the corresponding side of the lens holder 22.

FIG. 7B is a perspective view of the lens holder 22 wound with the first focusing coil 23 and the second focusing coil 24. In the other respects, the lens holder 22 of the present embodiment is configured to be the same as the lens holder 22 of the first embodiment.

According to the present embodiment configured as described above, as in the first embodiment, the lens holder 2 configured with a single member can be directly wound with all coils required. This makes it possible to increase the drive forces generated by the focusing coils and to make the optical pickup thinner.

Furthermore, according to the present embodiment, the upper part 23a of the first focusing coil 23 is wound around the projection 28a on one side of the lens holder 22 and the upper part 24a of the second focusing coil 24 is wound around the projection 28b on the other side of the lens holder 22, so that the space 2a formed between the two projections 28a and 28b is larger than the space 2a formed in the first embodiment. This allows the laser beam to pass through a space region closer to the objective lens 1, so that the optical pickup can be made thinner than in the first embodiment.

As described above, according to the present invention, the focusing coils and the tracking coils can be wound directly around the lens holder configured with a single member. This makes it possible to provide an optical pickup which can be assembled with superior workability. Also, each focusing coil is comprised of an upper part wound around an upper portion of the lens holder and a lower part wound around a lower portion of the lens holder. This configuration makes it possible to increase the number of turns of the focusing coils and to increase the drive forces generated by the focusing coils.

In the first and second embodiments described above, the lens holder 2 includes the coil winding parts 33, 34a, and 34b, brim parts 30, 31, 32a, and 32b, and supporting member fixing parts 9a, 9b, and 9c. The coil winding parts 33, 34a, and 34b are provided in the two layers 33 and 34 separated in the optical axis direction of the objective lens 1, with the coil winding parts 34a and 34b spaced apart from each other to be on two sides across the optical axis direction of the objective lens 1. The brim parts 30, 31, 32a, and 32b project from the coil winding parts 33, 34a, and 34b perpendicularly to the optical axis direction of the objective lens 1 with the brim part 30 projecting to be above the layer 33, with the brim part 31 projecting to be between the layers 33 and 34, and with the brim parts 32a and 32b projecting, on the two sides across the optical axis direction of the objective lens 1, to be below the layer 34. The supporting member fixing parts 9a, 9b, and 9c are included in the brim parts 30, 31, 32a, and 32b. The supporting members 6 are supported, at their ends on one side, by the supporting member fixing parts 9a, 9b, and 9c, respectively. In this configuration, focusing coils 3, 4, and 13 are wound dividedly in the two layers 33 and 34 (see FIGS. 1, 2A-2D, and 6A-6B).

In the third embodiment described above, the lens holder 2 includes the coil winding parts 38a, 38b, 39a, and 39b, brim parts 35, 36a, 36b, 37a, and 37b, and supporting member fixing parts 29a, 29b, and 29c. The coil winding parts 38a, 38b, 39a, and 39b are provided in the two layers 38 and 39 separated in the optical axis direction of the objective lens 1 to be on two sides across the optical axis direction of the objective lens 1. The brim parts 35, 36a, 36b, 37a, and 37b project from the coil winding parts 38a, 38b, 39a, and 39b perpendicularly to the optical axis direction of the objective lens 1 with the brim part 35 projecting to be above the layer 38, with the brim parts 36a and 36b projecting, on the two sides across the optical axis direction of the objective lens 1, to be between the layers 38 and 39 and with the brim parts 37a and 37b projecting, on the two sides across the optical axis direction of the objective lens 1, to be below the layer 39. The supporting member fixing parts 29a, 29b, and 29c are included in the brim parts 35, 36a, 36b, 37a, and 37b. The supporting members 6 are supported, at their ends on one side, by the supporting member fixing parts 29a, 29b, and 29c, respectively. In this configuration, the focusing coils 23 and 24 are wound dividedly in the two layers 38 and 39 (see FIG. 7).

As described above, according to the first to third embodiments, the lens holder 2 has the two layers comprised of the coil winding parts and the three layers comprised of the brim parts with the two layers comprised of the coil winding parts and the three layers comprised of the brim parts stacked alternately.

In the first and third embodiments, of the two layers comprised of the coil winding parts, at least the lower layer 34/39 is divided in the direction perpendicular to the optical axis direction of the objective lens 1, making up the first coil winding part 34a/39a and the second coil winding part 34b/39b so as to form the space 2a below the objective lens 1. The first coil part 3b/23b wound around the first coil winding part 34a/39a and the second coil part 4b/24b wound around the second coil winding part 34b/39b serve also as tilt coils.

In the second embodiment, of the two layers comprised of the coil winding parts, the lower layer 34 is divided in the direction perpendicular to the optical axis direction, making up the first coil winding part 34a and the second coil winding part 34b so as to form the space 2a below the objective lens 1. The coil 13a wound around the upper one of the two layers comprised of the coil winding parts, the coil 13b wound around the first coil winding part 34a, and the coil 13c wound around the second coil winding part 34b are, for example, as shown in FIG. 6A, electrically connected in series with connection lines 13d and 13e.

What is claimed is:

1. An optical pickup for an optical disk drive, comprising:
   an objective lens focusing light on an optical disc;
   a lens holder holding the objective lens;
   a focusing coil wound around the lens holder; and
   a supporting member supporting the lens holder,
   wherein the focusing coil includes a first focusing coil and a second focusing coil,
   the first focusing coil includes an upper part wound about a central axis extending in parallel with an optical axis of the objective lens and a lower part connected to the upper part via a connection line, and
   the second focusing coil includes an upper part wound, in a wiring system separate from the first focusing coil, about a central axis extending in parallel with the optical axis of the objective lens and a lower part connected to the upper part via a connection line.

2. The optical pickup according to claim 1, wherein the lower part of the first focusing coil and the lower part of the second focusing coil serve to effect both focusing operation and tilting operation.

3. The optical pickup according to claim 1, wherein each of the lower part of the first focusing coil and the lower part of the second focusing coil is wound around a part of the lens holder, the part of the lens holder projecting downward along an optical axis direction of the objective lens.

4. The optical pickup according to claim 1, wherein the upper part of the first focusing coil and the upper part of the second focusing coil are overlappingly wound around the lens holder.

5. The optical pickup according to claim 1, wherein the lens holder includes two parts projecting downward along the optical axis direction with a space formed between the two projecting parts.

6. An optical pickup installed in an optical disc drive and used, at least, to read information from an optical disc, the optical pickup comprising:
   an objective lens focusing light on an optical disc;
   a lens holder holding the objective lens; and
   a focusing coil wound around the lens holder,
   wherein the lens holder includes a first coil winding part and a second coil winding part which are dividedly formed on two sides perpendicularly across an optical axis direction of the objective lens so as to form a space between the first coil winding part and the second coil winding part below the objective lens, and
   the focusing coil at least includes a first coil part wound around the first coil winding part and a second coil part wound around the second coil winding part,
   and further comprising a third coil part provided to be above, in an optical axis direction of the objective lens, the first coil part and connected in series to the first coil part, and
   a fourth coil part provided to be above, in the optical axis direction, the second coil part and connected in series to the second coil part.

7. The optical pickup according to claim 6, wherein the first coil part and the second coil part are configured to be able to receive a focus signal and a tilt signal.

8. The optical pickup according to claim 6,
   wherein the lens holder includes a third coil winding part which is formed to be above, in the optical axis direction, the first coil winding part and the second coil winding part and to extend perpendicularly to the optical axis direction, and
   the third coil part and the fourth coil part are overlappingly wound around the third coil winding part, and one of the third coil part and the fourth coil part are wound over the other.

9. The optical pickup according to claim 8,
   wherein the lens holder includes a supporting member fixing part, provided on each of two lateral sides thereof, for fixing a supporting member which supports the lens holder, the two lateral sides being located perpendicularly across the optical axis direction, and
   on the two lateral sides of the lens holder, the supporting member fixing parts are provided on two sides, in the optical axis direction, of the coil winding parts.

10. The optical pickup according to claim 6,
    wherein the lens holder includes a third coil winding part formed to be above, in the optical axis direction, the first coil winding part and a fourth coil winding part formed to be above, in the optical axis direction, the second coil winding part,
    the third coil winding part and the fourth coil winding part are formed on two sides perpendicularly across the optical axis direction with the space formed between the third coil winding part and the fourth coil winding part, and
    the third coil part is wound around the third coil winding part and the fourth coil part is wound around the fourth coil winding part.

11. The optical pickup according to claim 10,
    wherein the lens holder includes a supporting member fixing part, provided on each of two lateral sides thereof, for fixing a supporting member which supports the lens holder, the two lateral sides being located perpendicularly across the optical axis direction, and on the two lateral sides of the lens holder, the supporting member fixing parts are provided on two sides, in the optical axis direction, of the coil winding parts.

12. The optical pickup according to claim 8, wherein the lens holder includes a first, a second, and a third supporting member fixing part, provided on each of two lateral sides thereof, for fixing supporting members which support the lens holder, the two lateral sides being located in the direction perpendicularly across the optical axis direction, on one of the two lateral sides of the lens holder, the first supporting member fixing part is provided below, in the optical axis direction, the first coil winding part, the second supporting member fixing part is provided between, in the optical axis direction, the first coil winding part and the third coil winding part, and the third supporting member fixing part is provided above, in the optical axis direction, the third coil winding part, and on the other of the two lateral sides of the lens holder, the first supporting member fixing part is provided below, in the optical axis direction, the second coil winding part, the second supporting member fixing part is provided between, in the optical axis direction, the second coil winding part and the third coil winding part, and the third supporting member fixing part is provided above, in the optical axis direction, the third coil winding part.

13. The optical pickup according to claim 10, wherein the lens holder includes a first, a second, and a third supporting member fixing part, provided on each of two lateral sides thereof, for fixing supporting members which support the lens holder, the two lateral sides being located in the direction perpendicularly across the optical axis direction, on one of the two lateral sides, the first supporting member fixing part is provided below, in the optical axis direction, the first coil winding part, the second supporting member fixing part is provided between, in the optical axis direction, the first coil winding part and the third coil winding part, and the third supporting member fixing part is provided above, in the optical axis direction, the third coil winding part, and on the other of the two lateral sides, the first supporting member fixing part is provided below, in the optical axis direction, the second coil winding part, the second supporting member fixing part is provided between, in the optical axis direction, the second coil winding part and the fourth coil winding part, and the third supporting member fixing part is provided above, in the optical axis direction, the fourth coil winding part.

14. The optical pickup according to claim 6, wherein the lens holder includes a third coil winding part formed to be above, in the optical axis direction, the first coil winding part and the second coil winding part and to extend perpendicularly to the optical axis direction in an area overlapping, in the optical axis direction, the first coil winding part and the second coil winding part, and the third coil part wound around the third coil winding part, the first coil part, and the second coil part are electrically connected in series.

15. An optical pickup installed in an optical disc drive and configured to be used, at least, to read information from an optical disc, the optical pickup comprising:
   an objective lens for focusing light on an optical disc;
   a lens holder for holding the objective lens;
   a focusing coil wound around the lens holder; and
   a plurality of supporting members for supporting the lens holder,
   wherein the lens holder includes:
      a coil winding part divided, in an optical axis direction of the objective lens, into two layers;
      a plurality of brim parts provided between the two layers and on two sides, in the optical axis direction, of the two layers, the brim parts projecting from a coil winding surface of the coil winding part in a direction crossing the optical axis direction; and
      a plurality of supporting member fixing parts which are provided in the brim parts and which fix the supporting members at their ends on one side, and
   wherein the focusing coil is dividedly wound in the two layers,
   wherein, of the two layers, at least the lower one is divided in a direction perpendicular to the optical axis direction into a first coil winding part and a second coil winding part so as to form a space under the objective lens, and
   a first coil part is wound around the first coil winding part and a second coil part is wound around the second coil winding part.

16. The optical pickup according to claim 15, wherein the first coil part wound around the first coil winding part and the second coil part wound around the second coil winding each part serve also as a tilt coil.

17. An optical pickup installed in an optical disc drive and configured to be used, at least, to read information from an optical disc, the optical pickup comprising:
   an objective lens for focusing light on an optical disc;
   a lens holder for holding the objective lens;
   a focusing coil wound around the lens holder; and
   a plurality of supporting members for supporting the lens holder,
   wherein the lens holder includes:
      a coil winding part divided, in an optical axis direction of the objective lens, into two layers;
      a plurality of brim parts provided between the two layers and on two sides, in the optical axis direction, of the two layers, the brim parts projecting from a coil winding surface of the coil winding part in a direction crossing the optical axis direction; and
      a plurality of supporting member fixing parts which are provided in the brim parts and which fix the supporting members at their ends on one side, and
   wherein the focusing coil is dividedly wound in the two layers,
   wherein, of the two layers, at least the lower one is divided in a direction perpendicular to the optical axis direction into a first coil winding part and a second coil winding part so as to form a space under the objective lens, and
   a coil wound in the upper one of the two layers and a coil wound around the first coil winding part, and a coil wound around the second coil winding part are electrically connected in series.

* * * * *